Patented July 23, 1929.

1,721,979

UNITED STATES PATENT OFFICE.

WILLIAM C. TAYLOR, OF CORNING, NEW YORK, ASSIGNOR TO CORNING GLASS WORKS, OF CORNING, NEW YORK, A CORPORATION OF NEW YORK.

GLASS.

No Drawing.   Application filed July 21, 1926. Serial No. 124,101.

I have discovered that the salts of molybdenum and also of tungsten (which two elements may be designated as known metallic elements of the even series of the sixth periodic group having an atomic weight between 95 and 185) may, in spite of their high cost, be used with advantage in the production of opal glasses; that when so used in relatively small quantities they give, in a glass otherwise suitable, and melted under proper conditions, a dense opal, and that the opacity produced thereby is not subjected to being burnt out on overheating as is the case in many of the present opals.

Generally speaking, glasses suitable to be opalized by the named elements are glasses which are sufficiently acidic in character and are melted under oxidizing conditions.

In other words glasses which are melted under oxidizing conditions will produce opacity provided they are sufficiently acidic in character, but if they are not sufficiently acidic in character they will be practically clear and colorless. On the contrary glasses which are melted under non-oxidizing conditions do not produce opacity but tend to produce color regardless of whether they are acidic or basic.

It is well known in the art that acidity in a glass is not strictly comparable to acidity in the ordinary use of the term, because in the latter sense there is no known means of determining when a glass ceases to be acidic and becomes basic or vice versa.

The acidity of a proper glass may be due to a variety of causes, for instance, to the introduction into an otherwise alkali batch of a substantial quantity of boric oxide, or to the use in the batch of known non alkali-earth bases (such as lead) in lieu of the alkali-earth bases (such as lime) commonly employed, or to decreasing the amount of the alkali (such as soda) present. The presence of the alkali-earths does not, however, prevent opalescence, provided the alkalinity due to such bases is neutralized by a proper quantity of boric oxide.

The oxidizing condition stated to be necessary to produce opacity may be brought about by the addition to the batch of an oxidizing agent such as niter.

As examples of glasses embodying this invention, the following table of four glasses is given in terms of percentage glass composition as calculated from the respective batches.

|  | A | B | C | D |
|---|---|---|---|---|
| $SiO_2$ | 71.00% | 72.00% | 58.00% | 58.00% |
| $Na_2O$ | 4.25 | 4.50 | 11.00 | 12.00 |
| PbO | 6.5 |  |  | 25.00 |
| $B_2O_3$ | 16.25 | 17.00 | 11.60 |  |
| CaO |  | 4.00 | 4.00 |  |
| F |  | 1.5 | 1.3 |  |
| $Al_2O_3$ |  |  | 13.5 |  |
| $MoO_3$ | 2.00 | 1.00 | .40 | 5.00 |

In the above table glass A is a lead borosilicate, glasses B and C are calcium borosilicates, and glass D is a lead flint, all of them carrying, in addition to the usual ingredients of such glasses, a salt of a known metallic element of the sixth group above stated to be effective to produce opacity.

Glasses B and C, due to the presence of fluorine and aluminum oxide, have a tendency toward opacity, so that a relatively small amount of the sixth group element is used. The presence of the small amount, however, permits the reduction of the amount of fluorine otherwise necessary to produce opacity in such a batch and thereby increases the life of the refractories and reduces danger of clearing on prolonging heating. Opacity can be obtained with these glasses without fluorine by increasing the sixth group element oxide.

Glass A has high thermal endurance and is a type of glass with which it has heretofore been difficult to obtain opacity.

In the above borosilicate glasses, A, B and C, tungsten trioxide ($WO_3$) may be substituted for molybdenum trioxide ($MoO_3$) in the direct ratio of their respective molecular weights (i. e., in the ratio of 1.6 parts of $WO_3$ for 1 part of $MoO_3$), without departing from my invention and without essentially changing the characteristics of the resultant glass. In the case of the lead flint glass, D, the substitution of $WO_3$ for $MoO_3$ is not as desirable because the opalescence resulting therefrom is not of sufficient density to be of commercial use.

In carrying out my invention a proper batch is mixed of ingredients necessary to give the desired composition, this batch including a small quantity of the proper oxidizing agent such as sodium nitrate, and is melted, the presence of the sodium nitrate causing the melting to be under oxidizing conditions.

The term "opal" is here used to designate glasses which are more or less opaque, and includes glasses which are opaque as well as those which are nearly opalescent. The specified group elements, however, tend to produce dense opals.

Having thus described my invention, what I claim and desire to secure by Letters Patent of the United States is:—

1. The hereinbefore described method of obtaining an opal glass which consists in melting under oxidizing conditions an acidic batch containing a known metallic element of the even series of the sixth periodic group having an atomic weight between 95 and 185.

2. The hereinbefore described method of obtaining an opal glass which consists in melting under oxidizing conditions a batch containing a substantial percentage of boric oxide and a known metallic element of the even series of the sixth periodic group having an atomic weight between 95 and 185.

3. The hereinbefore described method of obtaining an opal glass which consists in melting under oxidizing conditions a lead flint glass containing a known metallic element of the even series of the sixth periodic group having an atomic weight between 95 and 185.

4. A batch for an opal glass, said batch being acidic in character and containing an oxidizing agent and a salt of a known metallic element of the even series of the sixth periodic group having an atomic weight between 95 and 185.

5. A batch for an opal glass containing a substantial quantity of boric oxide, an oxidizing agent, and a salt of a known metallic element of the even series of the sixth periodic group having an atomic weight between 95 and 185.

6. A batch for an opal lead flint glass containing an oxidizing agent and a salt of a known metallic element of the even series of the sixth periodic group having an atomic weight between 95 and 185.

7. An acidic opal glass containing a salt of a known metallic element of the even series of the sixth periodic group having an atomic weight between 95 and 185, melted under oxidizing conditions.

8. An opal glass containing a substantial quantity of boric oxide and a salt of a known metallic element of the even series of the sixth periodic group having an atomic weight between 95 and 185, melted under oxidizing conditions.

9. An opal lead flint glass containing a salt of a known metallic element of the even series of the sixth periodic group having an atomic weight between 95 and 185, melted under oxidizing conditions.

In testimony whereof I hereunto affix my signature.

WILLIAM C. TAYLOR.